(12) United States Patent
De Jong et al.

(10) Patent No.: US 8,844,951 B2
(45) Date of Patent: Sep. 30, 2014

(54) INTEGRATED SUPPORT STRUCTURES FOR MOBILE MEDICAL SYSTEMS

(71) Applicant: Volcano Corporation, San Diego, CA (US)

(72) Inventors: Duane De Jong, Elk Grove, CA (US); Aaron J. Cheline, Sacramento, CA (US)

(73) Assignee: Volcano Corporation, San Diego, CA (US)

( * ) Notice: Subject to any disclaimer, the term of this patent is extended or adjusted under 35 U.S.C. 154(b) by 0 days.

(21) Appl. No.: 13/863,990

(22) Filed: Apr. 16, 2013

(65) Prior Publication Data

US 2013/0277932 A1 Oct. 24, 2013

Related U.S. Application Data

(60) Provisional application No. 61/625,827, filed on Apr. 18, 2012.

(51) Int. Cl.
*A61G 12/00* (2006.01)
*B62B 3/10* (2006.01)
*A47F 7/00* (2006.01)

(52) U.S. Cl.
CPC ... *B62B 3/10* (2013.01); *A47F 7/00* (2013.01); *A61G 12/008* (2013.01); *A61G 12/00* (2013.01)
USPC .............. 280/79.3; 280/47.34; 280/47.35; 280/769; 312/223.3; 361/679.01

(58) Field of Classification Search
CPC ... A61G 12/00; A61G 12/001; A61G 12/008; A61B 19/0271; A47B 31/00; A47F 7/00; B62B 3/10; B62B 5/06; B62B 5/061; G06F 1/16
USPC ............ 280/79.3, 47.34, 47.35, 35, 762, 769; 312/223.3; 248/122.1, 214, 121, 218.4; 361/600, 679.01, 679.02, 807–810; 600/301, 407, 437; 220/751; 211/107, 211/105.1, 105.2, 123
See application file for complete search history.

(56) References Cited

U.S. PATENT DOCUMENTS 3,840,250 A * 10/1974 Bott ............................. 403/262
5,038,819 A * 8/1991 Sutphen ........................ 137/343

(Continued)

FOREIGN PATENT DOCUMENTS

EP        381240 A2 * 8/1990
JP     2002-355128    12/2002

(Continued)

OTHER PUBLICATIONS

Medline Medical carts brochure, pdf created Sep. 2010, see e.g. p. 36 for accessory rails.*

(Continued)

*Primary Examiner* — J. Allen Shriver, II
*Assistant Examiner* — Steve Clemmons
(74) *Attorney, Agent, or Firm* — Haynes and Boone, LLP (57) ABSTRACT

In one embodiment, the present disclosure provides a portable medical instrument system. The system includes a frame for supporting system process and user interface components. One or more support rails are interconnected with the frame to provide an accessories support system to securely receive medical accessory components. In at least one embodiment, the support rails have a configuration substantially matching a bedrail of a hospital bed. In another aspect, the support rails have a height to width ratio of about 2 to 1. In still a further aspect, the support rails have a height to width ration of 1 to 0.375. According to yet another aspect, at least one of the support rails may be molded from portions of the portable medical system itself.

16 Claims, 5 Drawing Sheets

(56) References Cited

U.S. PATENT DOCUMENTS

| | | | | |
|---|---|---|---|---|
| 5,372,265 A | * | 12/1994 | Monch | 211/187 |
| 5,518,310 A | * | 5/1996 | Ellman et al. | 312/249.12 |
| 5,673,983 A | * | 10/1997 | Carlson et al. | 312/218 |
| 6,142,940 A | * | 11/2000 | Lathbury et al. | 600/437 |
| D459,477 S | * | 6/2002 | Stocks et al. | D24/164 |
| 6,447,451 B1 | * | 9/2002 | Wing et al. | 600/437 |
| 6,493,220 B1 | * | 12/2002 | Clark et al. | 361/679.41 |
| 6,669,224 B2 | * | 12/2003 | Newkirk | 280/508 |
| 6,769,747 B2 | * | 8/2004 | Chan et al. | 108/157.16 |
| 7,154,397 B2 | * | 12/2006 | Zerhusen et al. | 340/573.1 |
| D544,962 S | * | 6/2007 | Diener et al. | D24/186 |
| 7,490,837 B2 | * | 2/2009 | Pond et al. | 280/47.35 |
| 7,534,211 B2 | * | 5/2009 | Hwang et al. | 600/459 |
| 7,591,786 B2 | * | 9/2009 | Holmberg et al. | 600/437 |
| 7,621,544 B2 | * | 11/2009 | Rossini | 280/79.3 |
| 7,708,237 B2 | * | 5/2010 | Mummert et al. | 248/122.1 |
| D629,523 S | * | 12/2010 | Porter et al. | D24/185 |
| 7,938,372 B2 | * | 5/2011 | MacLeod | 248/122.1 |
| D643,535 S | * | 8/2011 | Ross et al. | D24/164 |
| 2002/0044059 A1 | * | 4/2002 | Reeder et al. | 340/573.1 |
| 2002/0138034 A1 | * | 9/2002 | Derek et al. | 604/6.14 |
| 2005/0218616 A1 | * | 10/2005 | Copeland et al. | 280/47.35 |
| 2005/0288571 A1 | * | 12/2005 | Perkins et al. | 600/407 |
| 2006/0043244 A1 | * | 3/2006 | Graham et al. | 248/161 |
| 2007/0034753 A1 | * | 2/2007 | Lee | 248/121 |
| 2007/0185390 A1 | * | 8/2007 | Perkins et al. | 600/300 |
| 2007/0218769 A1 | * | 9/2007 | Mummert et al. | 439/630 |
| 2007/0232933 A1 | * | 10/2007 | Gille et al. | 600/481 |
| 2008/0084147 A1 | * | 4/2008 | Brown | 312/223.3 |
| 2008/0146922 A1 | * | 6/2008 | Steins et al. | 600/437 |
| 2008/0251656 A1 | * | 10/2008 | Prismall | 248/121 |
| 2008/0296245 A1 | * | 12/2008 | Punzel et al. | 211/153 |
| 2008/0315734 A1 | * | 12/2008 | Birsel et al. | 312/223.3 |
| 2009/0012532 A1 | * | 1/2009 | Quaid et al. | 606/130 |
| 2009/0085317 A1 | * | 4/2009 | Livengood et al. | 280/79.3 |
| 2009/0195514 A1 | * | 8/2009 | Glynn et al. | 345/173 |
| 2009/0221880 A1 | * | 9/2009 | Soderberg et al. | 600/300 |
| 2010/0056913 A1 | * | 3/2010 | Hirakui et al. | 600/437 |
| 2010/0148458 A1 | * | 6/2010 | Ross et al. | 280/47.34 |
| 2010/0213679 A1 | * | 8/2010 | Smith et al. | 280/47.35 |
| 2010/0324380 A1 | * | 12/2010 | Perkins et al. | 600/301 |
| 2011/0025007 A1 | * | 2/2011 | Butler et al. | 280/47.35 |
| 2011/0083274 A1 | * | 4/2011 | Newkirk et al. | 5/624 |
| 2011/0125232 A1 | * | 5/2011 | Landy et al. | 607/105 |
| 2011/0272902 A1 | * | 11/2011 | Arceta et al. | 280/47.35 |
| 2012/0014621 A1 | * | 1/2012 | Steinberg et al. | 383/33 |
| 2012/0126503 A1 | * | 5/2012 | Butler et al. | 280/47.35 |
| 2012/0212116 A1 | * | 8/2012 | McRorie et al. | 312/249.13 |

FOREIGN PATENT DOCUMENTS

| | | | | |
|---|---|---|---|---|
| JP | 2002355128 A | * | 12/2002 | |
| JP | 2012-019900 | | 2/2012 | |
| JP | 2012019900 A | * | 2/2012 | |

OTHER PUBLICATIONS

Lifespan brochure with Copyright 2008, MEMO 2 can MEMO 4 Carts with accessory rails.*

Mercury medical catalog, pdf created Feb. 2009; p. 226, Memo cart with accessory rails.*

Volcano s5 data sheet.*

Volcano s5 press release dated Apr. 2006.*

Boston Scientific iLab "Intro to IVUS Technology", copyright 2010.*

International Searching Authority/Korean Intellectual Property Office, "Notification of Transmittal of the International Search Report and the Written Opinion of the International Searching Authority, or the Declaration," for PCT/US2013/036800, mailed Jul. 2, 2013, 11 pages.

* cited by examiner

INTEGRATED SUPPORT STRUCTURES FOR MOBILE MEDICAL SYSTEMS

CROSS REFERENCE TO RELATED APPLICATIONS

The present application claims priority to and the benefit of U.S. Provisional Patent Application No. 61/625,827, filed Apr. 18, 2012, which is hereby incorporated by reference in its entirety.

Embodiments described herein relate to the field of portable medical systems. More particularly, embodiments described herein are related to providing mobile support structures to support a medical system and related accessories.

In the field of portable medical systems, multiple instruments, patient interface modules ("PIMs") or other accessory devices are carried from one patient bed to the next, to monitor patient's performance, sense patient parameters, or provide medication. Some of the commonly used PIMs and accessories are handheld instruments with a relatively small form factor and low weight. Typical hospital beds include hangers such as bedrails that enable PIMs and other accessories to be placed next to the patient. The PIMs have clips and brackets designed for ease of mounting and dismounting onto the bedrails. Also, PIMs are easily moved along the rail to adjust the position relative to the patient, allowing multiple PIMs to be placed on a single bedrail.

However, some accessories, such as PIMs, need to be carried together with heavier and complex medical instrumentation. In particular, many complex instruments use computers and desktop platforms including keyboards and one or more large monitors. In such cases, the instruments are displaced from one patient location to another using a wheeled cart, which is easily pushed around by medical personnel. Different models for carts are commonly used in the market to allow for stability and maneuverability of a desktop platform including a CPU box a keyboard and a monitor. However, current models and designs for such carts do not allow accessories to be securely fixed to the cart for ease of transport. In some instances, current models and designs may allow for accessories to be fixed to the cart, having a specific fixing location for each specific accessory. This limits the flexibility of operation of the accessory and the positioning of the cart relative to the patient. This also limits the number of PIMs that may be attached on a given cart.

Therefore, there is a need for storage solutions that permit transport of accessory items in conjunction with complex medical devices.

In one embodiment, the present disclosure provides a portable medical instrument system. The system includes a frame for supporting system process and user interface components. One or more support rails are interconnected with the frame to provide an accessories support system to securely receive medical accessory components. In at least one embodiment, the support rails have a configuration substantially matching a bedrail of a hospital bed. In another aspect, the support rails have a height to width ratio of about 2 to 1. In still a further aspect, the support rails have a height to width ratio of 1 to 0.375. According to yet another aspect, at least one of the support rails may be molded from portions of the portable medical system itself.

These and other embodiments of the present invention will be described in further detail below with reference to the following drawings.

BRIEF DESCRIPTION OF THE DRAWINGS

In the figures, elements having the same reference number have the same or similar functions.

DETAILED DESCRIPTION

In a medical facility, complex medical instrumentation is often placed on carts that can be easily moved around from patient to patient rather than moving the patient to the equipment. Thus, medical instrumentation can be used at the bedside of multiple patients. The main medical instrument that sits in the cart typically includes a large CPU unit, a keyboard, and at least one monitor. A plurality of accessories associated with the medical system may also be included as accessories for the cart-based unit. The accessories need to be carried together with the main frame e.g. to provide a user interface.

The present embodiments and concepts can be applied to a wide variety of cart based medical systems. However, as one non-limiting example, one such medical instrument may be an intra-vascular, ultra-sound machine (IVUS). On a roll-around IVUS cart, storage of a PIM or other accessory may be desirable. In some embodiments it may be desirable for carts to include multiple PIMs in a single unit. In certain applications up to five (5) PIMs may be used with a single cart. Many of these PIMs may also be located at the bedrail, or transferred between the cart and the bedrail.

By incorporating a piece of support rail into a roll-around cart, a single PIM attached to the bedrail may be used in multiple locations and configurations. According to some embodiments, different accessories may be hung from a piece of rail as disclosed herein. For example, cable hooks, literature holders, and other medical instruments and accessories may be conveniently attached to the rail piece. This simplifies the transport of medical equipment around a facility. Thus, in embodiments consistent with the present disclosure, rails on either side of a roll-around cart are similar in cross section size and shape to the cross section size and shape of a bedrail in a hospital bed. Further embodiments may include a piece of a bedrail as used in a hospital bed, attached to a roll-around cart as a support rail. This enables transferring medical accessories between the bedrail and the roll-around cart easily and securely, facilitating the management of medical care to the patient. Embodiments consistent with the present disclosure also facilitate a more efficient handling of medical equipment and accessories for a group of patients in a hospital.

Furthermore, embodiments consistent with the present disclosure include support rails that allow different medical accessories to be placed in any location along the rail. Thus, an operator handling a medical accessory may fix the accessory to the cart at any convenient location within the cart.

Figure 1:
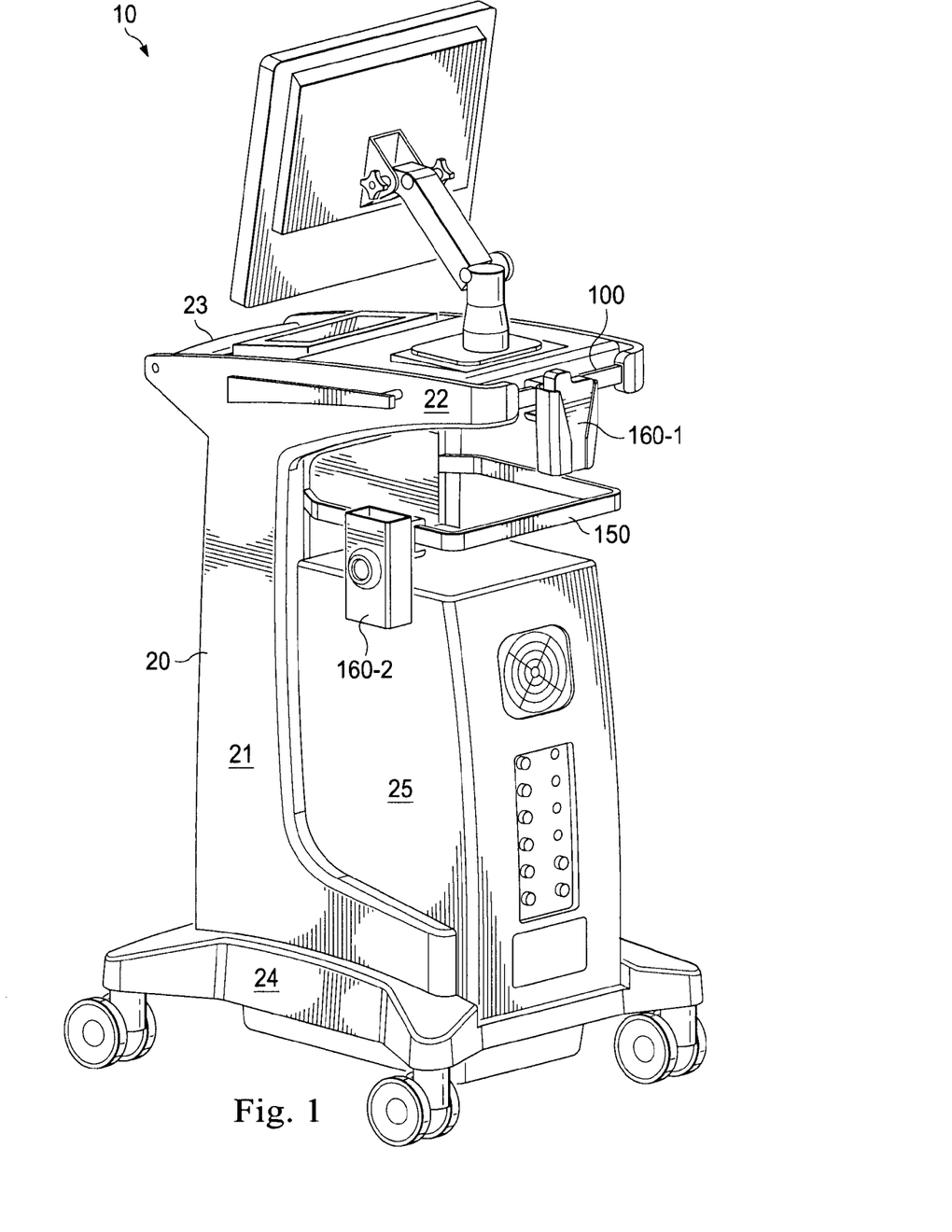
FIG. 1 shows a partial view of a cart including support rails according to embodiments disclosed herein.

FIG. 1 shows a partial view of a cart 10 including support rails 100 and 150, according to embodiments disclosed herein. Cart 10 has a frame 20 formed by a vertical portion 21 joining a top platform 22 and a bottom platform 24. Bottom platform 24 includes wheels to enable rolling for cart 10. Bottom platform 24 holds the bulk of the medical instrument to be carried by cart 10. Cart 10 may also include a casing 25 on bottom platform 24, to enclose and protect the medical instrument. Casing 25 may be made of acrylic or plastic, or a metal such as aluminum, and include a fan for providing a cooling air for the enclosed medical instrument. Also, casing 25 may include a panel of electrical connections for the enclosed medical instrument. In some embodiments the medical instrument may be a computing device for an IVUS machine. The bulk of the medical instrument typically includes a computer having a CPU unit including disk drives and other computer elements. Top platform 22 includes a handle bar 23 for pushing cart 10. Top platform 22 holds user-interface accessories, such as a keyboard and monitor, connected to the bulk of the medical instrument on bottom platform 24.

According to embodiments consistent with the present disclosure, support rail 100 may be a rail portion extending from top platform 22, opposite handlebar 23. In some embodiments, support rail 100 may be placed on one of the sides of top platform 22. FIG. 1 illustrates a PIM 160-1 placed on support rail 100. Support rail 100 extends from top platform 22 forming a continuous loop, as illustrated in FIG. 1. In such configuration, top platform 22 has two protruding prongs holding either end of support rail 100. Thus, the length of support rail 100 may be used almost in its entirety for holding PIMs. In embodiments where support rail 100 is made of a hard metal, a configuration such as shown in FIG. 1 precludes any sharp, hard ends protruding out of the periphery of top platform 22. Some embodiments may use one or more T-shape couplers to attach support rail 100 to top platform 22.

A support rail according to embodiments disclosed herein may be formed as intermediate support rail 150, shown in FIG. 1. Support rail 150 is placed on portion 21 of cart 10, forming a C-shape between the two vertical pieces of frame 20 forming portion 21. Thus, intermediate support rail 150 may provide ample space to place PIMs around a longer perimeter. FIG. 1 shows PIM 160-2 placed on rail 150, with plenty of space for other accessories to be carried by cart 10. Furthermore, embodiments of support rail 150 consistent with the present disclosure have rounded corners and edges to avoid sharp, hard edges protruding outside of the periphery of cart 10.

Embodiments of support rails 100 and 150 consistent with the present disclosure enable the transport of a plurality of accessories on a single cart such as cart 10. This allows shared use of a plurality of accessories between multiple patient beds. Also, support rails 100 and 150 free-up space in top platform 22 and bottom platform 24, according to embodiments herein.

Figure 2:
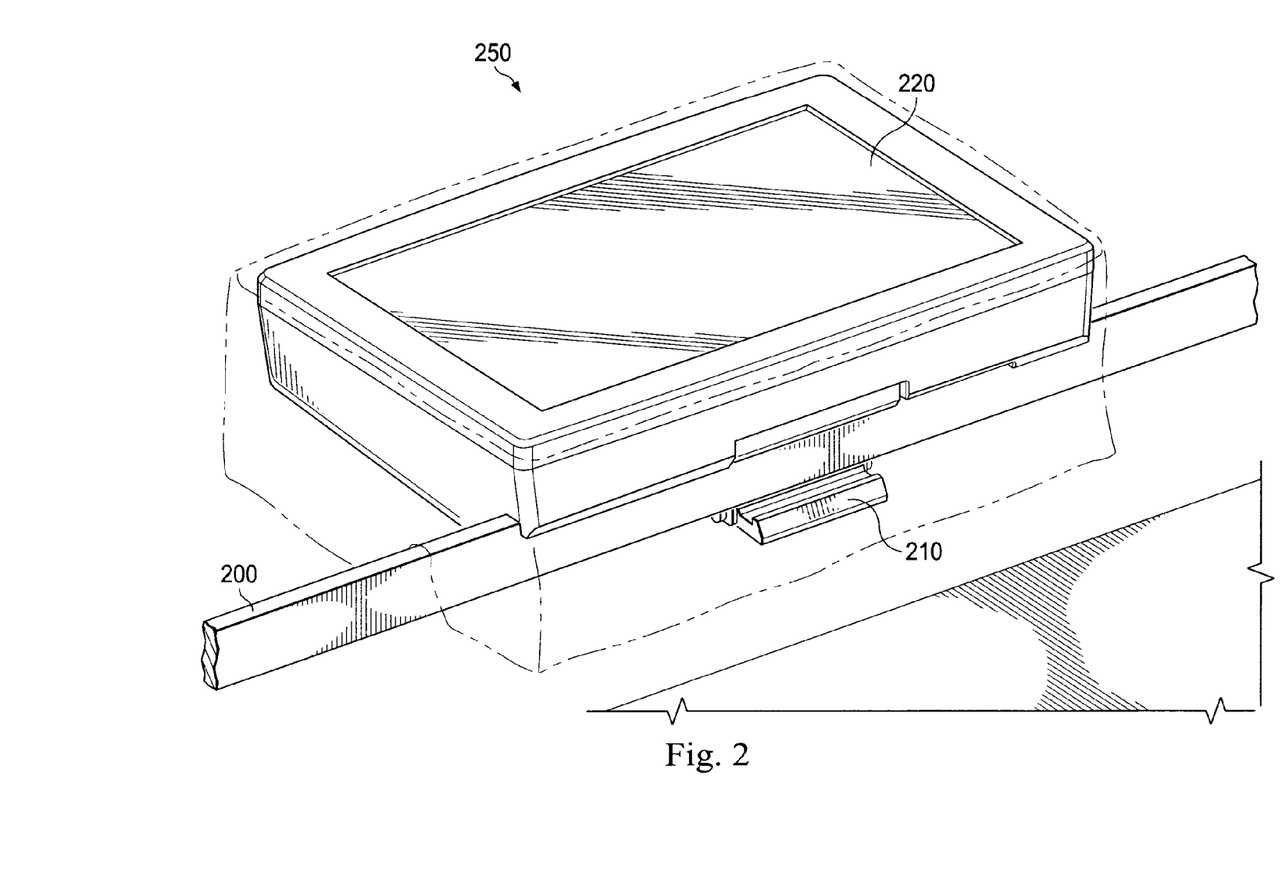
FIG. 2 shows a partial view of a medical accessory mounted on a support rail according to some embodiments disclosed herein.

FIG. 2 shows a partial view of a touch screen display and input accessory 220 mounted on a support rail 200, according to some embodiments disclosed herein. A clip 210 holds PIM 220 securely on bedrail 200. In some embodiments, PIM 220 may be a display device coupled to a medical instrument. For example, support rail 200 may be attached to a cart similar to support rails 100 and 150 of FIG. 1. FIG. 2 shows PIM 220 placed horizontally to display its flat surface directly 'up'. In some embodiments, clip 210 may allow PIM 220 to be oriented at a desired angle relative to a user or viewer. Thus, it will be appreciated that rail 200 may replace handlebar 23 on cart 10 (cf. FIG. 1) such that the display unit 220 can be a user-input device for the sensing system.

Figure 3:
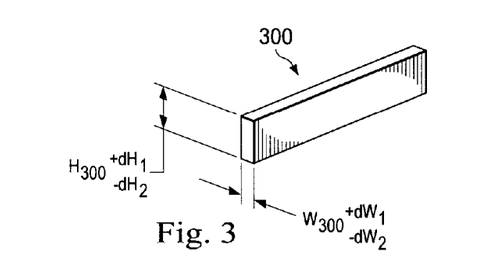
FIG. 3 shows a partial perspective view of a support rail according to some embodiments disclosed herein.

FIG. 3 shows a partial perspective view of a piece of support rail 300 according to some embodiments disclosed herein. Piece 300 may have a rectangular cross section with a height H300 and a width W300. According to embodiments disclosed herein, the cross section of support rail 300 is similar to the cross section of a patient's bedrail in a hospital bed. Thus, medical instrumentation such as PIMs that are generally placed on patient's bedrails may also be placed on rails having a cross section consistent with rail 300. For example, support rails 100 and 150 in FIG. 1 may have a cross section consistent with the cross section of support rail 300 in FIG. 3. The cross-section of support rail 300 in FIG. 3 is approximately rectangular in shape. One of regular skill in the art would recognize that the exact shape of the cross-section of support rail 300 or support rails 100 and 150 is not limiting. Some embodiments may include a support rail having a rounded cross-section, or circular cross-section, or an oval cross section, such as an elliptical shape. The shape and size of the cross section of support rail 300 is generally determined by the shape and size of the cross section of a patient's bedrail in a hospital bed, according to some embodiments.

In some embodiments, height H300 may be approximately one (1) inch, and width W300 may be approximately ⅜ of an inch (=0.375 inches). As illustrated in FIG. 3, height H300 has tolerance values dH1 and dH2, and width W300 has tolerance values dW1 and dW2. In some embodiments, tolerance dH1 may be about 0.05 inches, and dH2 may be about 0.1 inches. In some embodiments, tolerance dW1 may be about 0.030 inches and tolerance dW2 may be about 0.125 inches. In the illustrated examples, the rail has a height to width ratio of approximately 2 to 1. More specifically, the height to width ratio is 1 to 0.375.

Thus, embodiments consistent with the present disclosure include a roll-around cart for carrying medical instrumentation such that the cart includes support rails. The support rails have a cross section similar to that of a patient's bedrail, thus enabling the cart to carry medical instrumentation such as PIMs, typically placed on a patient's bedrail.

Figure 4:
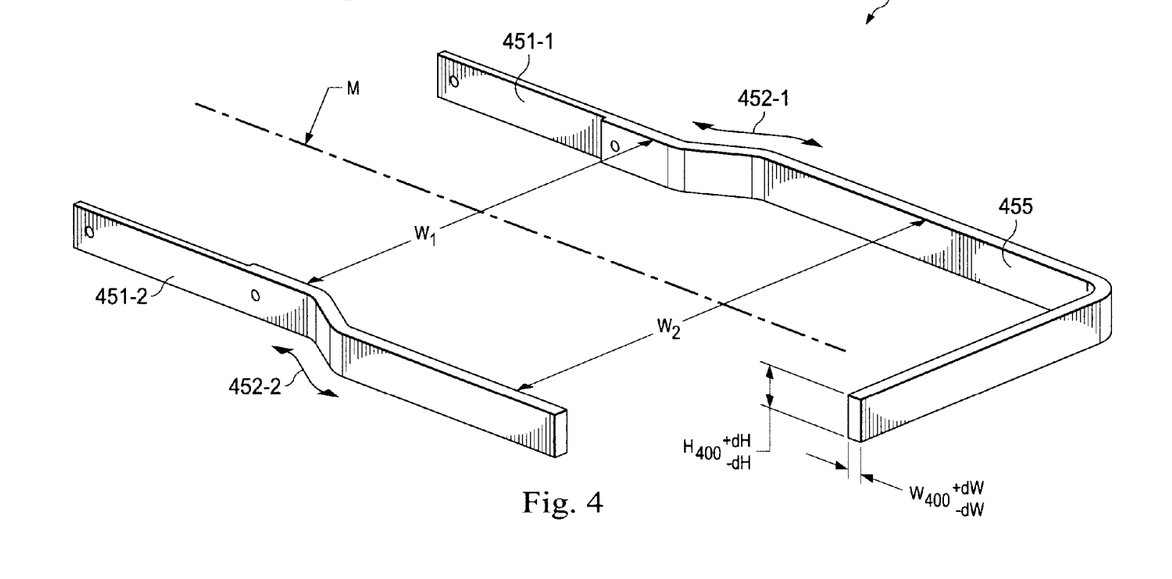
FIG. 4 shows a partial view of a support rail according to some embodiments disclosed herein.

FIG. 4 shows a partial cross-sectional view of a support rail 450 according to some embodiments disclosed herein. Support rail 450 has a continuous C-shape that enables it to be attached to a cart in a manner similar to rail 150 in portion 21 of cart 10 (cf. FIG. 1). In some embodiments, rail 450 includes end portions 451-1 and 451-2 to be coupled to a cart. End portions 451-1 and 451-2 may include holes so that fixtures (e.g. screws or bolts) may be placed through, in order to attach rail 450 to cart 10. For example, end portions 451-1 and 451-2 may be attached to either side of vertical portion 21 in frame 20 of cart 10 (cf. FIG. 1). In some embodiments, end portions 451-1 and 451-2 may be molded into a vertical portion of a cart frame, such as portion 21 in frame 20 of cart 10 (cf. FIG. 1).

Loop portion 455 extends from end portions 451-1 to 451-2 forming a loop, having an extended perimeter that allows a plurality of accessories or PIMs to be placed on it. According to some embodiments, loop portion 455 may extend the perimeter of rail 450 by adding bends 452-1 and 452-2. In embodiments consistent with the present disclosure bends 452-1 and 452-2 may be symmetric about a mid axis M (cf. FIG. 4). Thus, a width $W_1$ at connection end portions 451-1 and 451-2 is smaller than a width $W_2$ on loop portion 455 (cf. FIG. 4). In some embodiments, loop portion 455 is designed to loop around and leave space for casing 25. Thus, loop portion 455 not only has an extended perimeter, but also allows for bigger pieces of desktop equipment to be placed on bottom platform 24, while indenting the connection sections 451-1 and 451-2 to limit potential hazards to other equipment or personnel.

Figure 5:
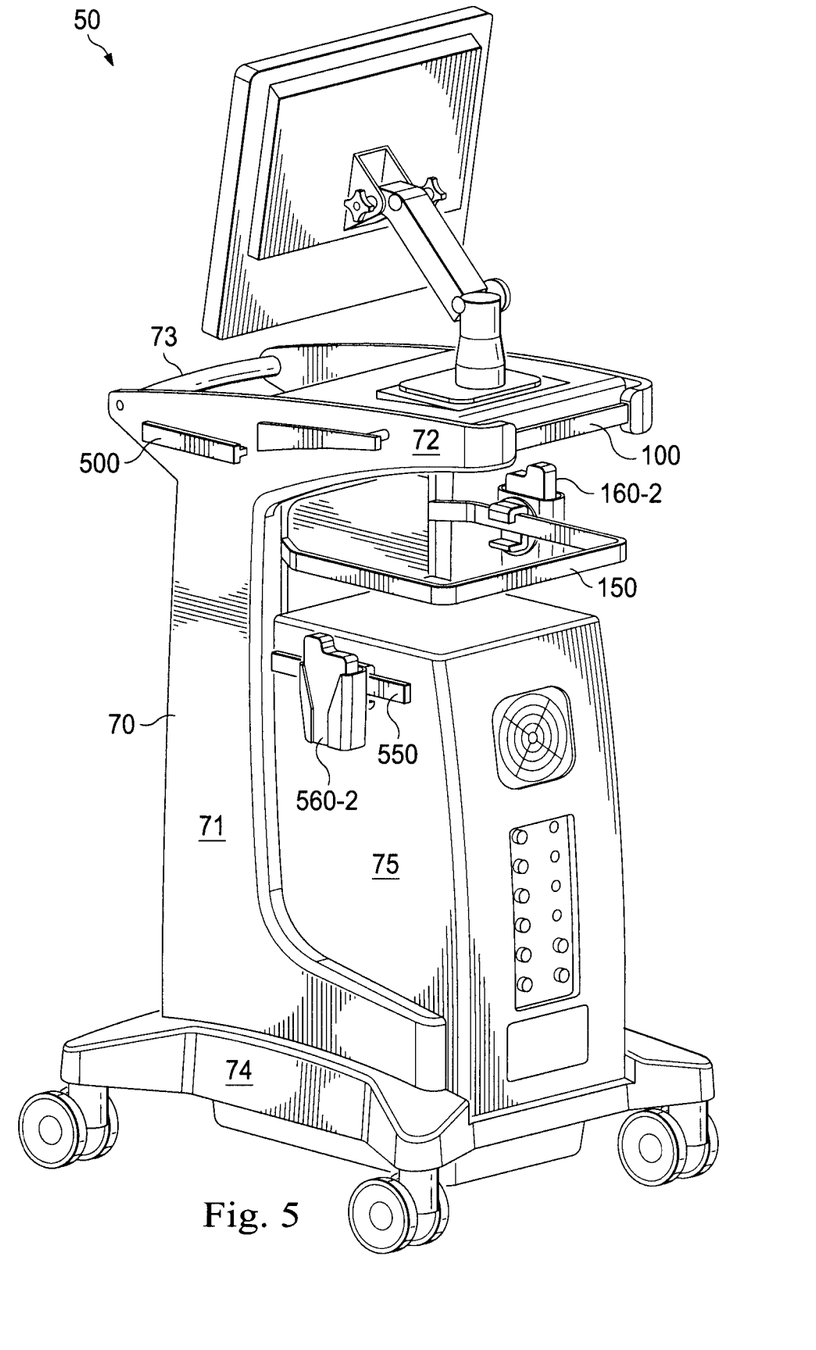
FIG. 5 shows a partial view of a cart including support rails according to embodiments disclosed herein.

FIG. 5 shows a partial view of a cart 50 including support rails 100 and 150, and support rails 500 and 550, according to embodiments disclosed herein. Cart 50 has a frame 70 formed by a vertical portion 71 joining a top platform 72 and a bottom platform 74. Bottom platform 74 includes wheels to enable rolling for cart 50. Bottom platform 74 holds the bulk of the medical instrument to be carried by cart 50. Cart 50 may also include a casing 75 to enclose and protect the medical instrument. Top platform 72 includes a handle bar 73 for pushing cart 50. Top platform 72 holds user-interface accessories, such as a keyboard and monitor, connected to the bulk of the medical instrument on bottom platform 74. According to embodiments disclosed herein, cart 50 may be as cart 10 described in detail above in relation to FIG. 1. Thus, frame 70 may be as frame 20, top platform 72 may be as top platform 22, bottom platform 74 may be as bottom platform 24, and vertical portion 71 may be as vertical portion 21 (cf. FIG. 1). Furthermore, handle bar 73 may be as handle bar 23, and support rails 100 and 150 may be as disclosed in detail in relation to FIGS. 3 and 4, above. FIG. 5 also shows PIM 160-2 placed on rail 150.

FIG. 5 illustrates support rail 500 protruding out of top platform 72, and support rail 550 protruding out of casing 75. According to embodiments consistent with the present disclosure, support rails 500 and 550 may be integral parts of cart 50. For example, support rails 500 and 550 may be molded from portions of the cart frame 70. In some embodiments, molded support rail 500 is formed out of the material in top platform 72, on at least one side of top platform 72. Molded support rail 550 is formed out of the material in casing 75, and on at least one side of casing 75. Molded support rails 500 and 550 are similar to rails 100 and 150 in that the cross section of molded support rails 500 and 550 is similar to the cross section of a patient bedrail. Thus, medical instrumentation such as PIMs that are typically placed in a patient's bedrail may also be placed in either of molded rails 500 or 550. Thus, for example a PIM 560-2 may be placed on molded rail 550. More generally, any PIM that may be placed on a patient's bedrail may also be placed anywhere along either of support rails 100 or 150, and molded support rails 500 or 550, according to embodiments consistent with the present disclosure. In some embodiments, support rails 500 and 550 may be made out of metal or any other hard material different from the material in casing 75 and top platform 72. In such configuration, support rail 550 may be attached to casing 75 using screws or any other fixture. And support rail 500 may be attached to top platform 72 using screws or any other fixture.

Figure 6:
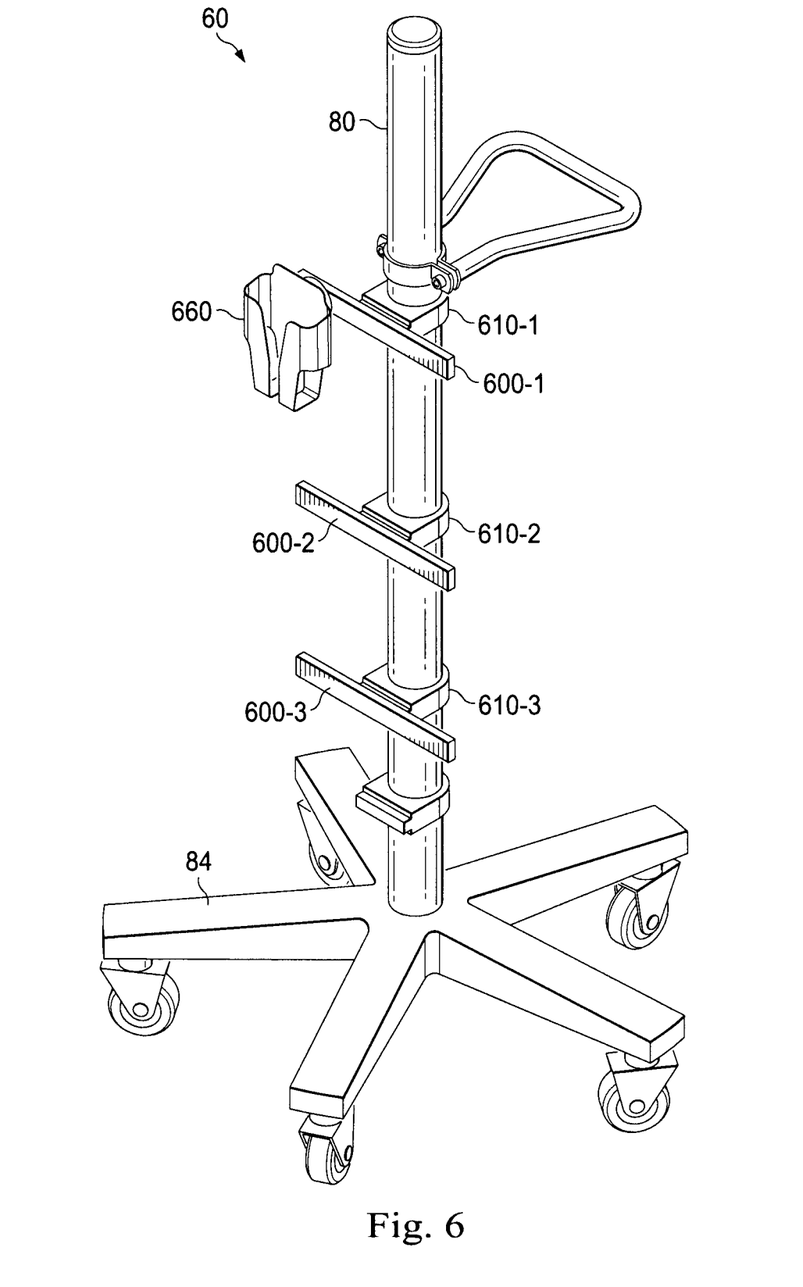
FIG. 6 shows a partial view of a moving pole including support rails according to embodiments disclosed herein.

FIG. 6 shows a partial view of a moving pole 60 including support rails 600-1, 600-2, and 600-3, according to embodiments disclosed herein. According to some embodiments, moving pole 60 may include a pole 80 that holds a bottle or a container with Intra-Venous (IV) liquid. In some embodiments, pole 60 is carried around by a patient, a nurse, or other medical personnel, who may be connected to the container with IV liquid. Base 84 in moving pole 60 includes wheels to enable easy motion in any direction.

According to some embodiments, brackets 610-1, 610-2, and 610-3 attach support rails 600-1, 600-2, and 600-3 to pole 80, respectively. FIG. 6 illustrates support rails 600 attached to brackets 610 by two screws. Brackets 610 may have a ring shape that is fastened to pole 80. One of regular skill in the art would recognize that many other configurations may be used to attach support rails 600 to pole 80, such as bolts directly coupling the rails to the pole. Support rails 600-1, 600-2, and 600-3 may be as described in detail above in relation to rail 200 (cf. FIG. 2), rail 300 (cf. FIG. 3), or rail 500 (cf. FIG. 5). In particular, support rails 600-1, 600-2, and 600-3 may have a cross section similar to or substantially the same as the cross-section of a hospital bedrail (cf. FIG. 3). Thus, PIMs and other devices attachable to a hospital bedrail may also be attached to moving pole 60. For example, FIG. 6 illustrates a fixture 660 to hold a PIM.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A cart for carrying medical instrumentation, the cart comprising:

a frame having first and second parallel spaced vertical portions, the first spaced vertical portion having a first interior surface and the second spaced vertical portion having a second interior surface opposed to the first interior surface, the first and second interior surfaces being spaced apart by a first distance such that the first and second parallel spaced vertical portions are configured to receive the medical instrumentation therebetween;

a support rail attached to the frame such that the support rail is cantilevered from the frame, wherein the support rail includes a first section and a second section extending from the frame parallel to each other and to a first axis and a third section coupled to the first and second sections and extending perpendicular to the first and second sections, wherein the first section of the support rail includes a first end portion coupled to the first interior surface of the first spaced vertical portion of the frame and wherein the second section of the support rail includes a second end portion coupled to the second interior surface of the second spaced vertical portion of the frame, the first and second end portions being disposed parallel to each other and to the first axis and being separated by a second distance approximately equal to the first distance, and the first and second end portions attaching the first and second sections of the support rail to the frame;

wherein the first section of the support rail further includes a first transition zone and a first loop section, the first transition zone being disposed between the first end portion and the first loop section and being angled with respect to the first end portion such that a vertical plane coextensive with the first end portion is not coplanar with the first loop section, and wherein the second section of the support rail further includes a second transition zone and a second loop section, the second transition zone being disposed between the second end portion and the second loop section and being angled with respect to the second end portion such that a vertical plane coextensive with the second end portion is not coplanar with the second loop section, the first and second loop sections being parallel to each other and to the first axis and being separated by a third distance greater than the second distance;

wherein the third section of the support rail has a length approximately equal to the third distance between first and second loop sections of the support rail, and wherein a first end of the third section of the support rail is continuously coupled to the first loop section of the first section of the support rail and wherein a second end of the third section of the support rail is continuously coupled to the second loop section of the second section of the support rail such that the first loop section, the third section of the support rail, and the second loop section form a continuous loop;

a bottom platform joined to the frame for holding processing components of the medical instrumentation, the bottom platform including wheels for rolling the cart; and a top platform for holding at least a user interface device;

wherein the support rail is disposed between the top platform and the bottom platform and within an outer profile of the cart defined by the top platform and the bottom platform; and wherein the first loop section, the second loop section, and the third section of the support rail are sized and shaped similar to a rail on which medical accessories are mounted during use with a patient such that the medical accessories are mounted to the support rail in a similar manner for storage on the cart.

2. The cart of claim 1, further comprising a first support structure configured to receive medical accessories disposed on a side of the top platform.

3. The cart of claim 2, wherein the first support structure is molded on at least one side of the top platform.

4. The cart of claim 1, wherein the support rail has a height and a width and wherein the height is at least twice as large as the width.

5. The cart of claim 4, wherein the height is approximately one inch and the width is approximately 0.375 inches.

6. The cart of claim 1, wherein the support rail has at least one of rectangular cross section, a rounded cross section, a circular cross section, and an oval cross section.

7. The cart of claim 1, wherein the support rail is molded from the frame.

8. The cart of claim 1, further comprising a casing on the bottom platform to enclose a medical instrument, the casing being disposed between the first and second parallel spaced vertical portions of the frame;

wherein the continuous loop formed by first loop section, the third section of the support rail, and the second loop section has an extended perimeter configured to accommodate the casing therein.

9. The cart of claim 8, further comprising a second support structure placed on at least one side of the casing.

10. The cart of claim 9, wherein the second support structure is molded from the casing.

11. The cart of claim 9, wherein the second support structure is attached to the casing.

12. The cart of claim 8, wherein the casing is formed from at least one of acrylic, plastic, or metal.

13. The cart of claim 1, wherein the top platform further includes a third support structure configured to receive medical accessories and positioned on a side of the top platform opposite the side of the top platform including a handlebar, the support structure being spaced apart from and disposed parallel to the third section of the support rail.

14. The cart of claim 13, wherein the third support structure is held by two prongs protruding from the top platform.

15. The cart of claim 14, wherein the third support structure has a length that is approximately equal to a distance between the two prongs.

16. The cart of claim 1, wherein the support rail is substantially C-shaped.

* * * * *